United States Patent

[11] 3,592,238

| [72] | Inventors | Ernst Scheffler<br>Langenhagen;<br>Gerhard Ziemek, Hannover, both of,<br>Germany |
|---|---|---|
| [21] | Appl. No. | 852,810 |
| [22] | Filed | Aug. 25, 1969 |
| [45] | Patented | July 13, 1971 |
| [73] | Assignee | Kabel-und Metallwerke<br>Gutehoffnungshutte Aktiengesellschaft<br>Hannover, Germany |

[54] SPACER FOR COAXIAL PIPES
10 Claims, 4 Drawing Figs.

[52] U.S. Cl. ................................................ 138/114,
138/148, 138/149
[51] Int. Cl. ..................................................... F16l 9/18,
F16l 11/00

[50] Field of Search. ......................................... 138/114,
148, 113, 149; 257/254, 262.2

[56] References Cited
UNITED STATES PATENTS

| 319,738 | 6/1885 | Mckinney | 138/148 |
| 2,131,987 | 10/1938 | Studt et al. | 138/148 UX |
| 2,875,987 | 3/1959 | Valley | 257/254 |
| 3,332,446 | 7/1967 | Mann | 138/114 |
| 3,390,703 | 7/1968 | Matlow | 138/114 |
| 3,473,575 | 10/1969 | Vogelsang et al. | 138/149 |

*Primary Examiner*—Henry K. Artis
*Attorney*—Smyth, Roston & Pavitt

ABSTRACT: Coaxial pipes are positioned one inside the other and maintained by a helical spacer constructed from loosely piled tapes, fastened to each other in isolated points.

PATENTED JUL 13 1971 3,592,238
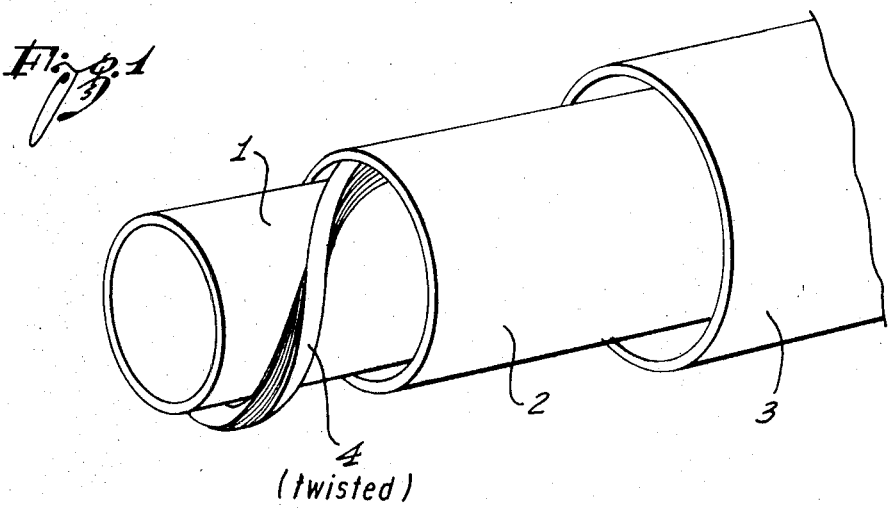
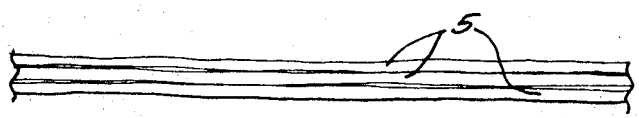
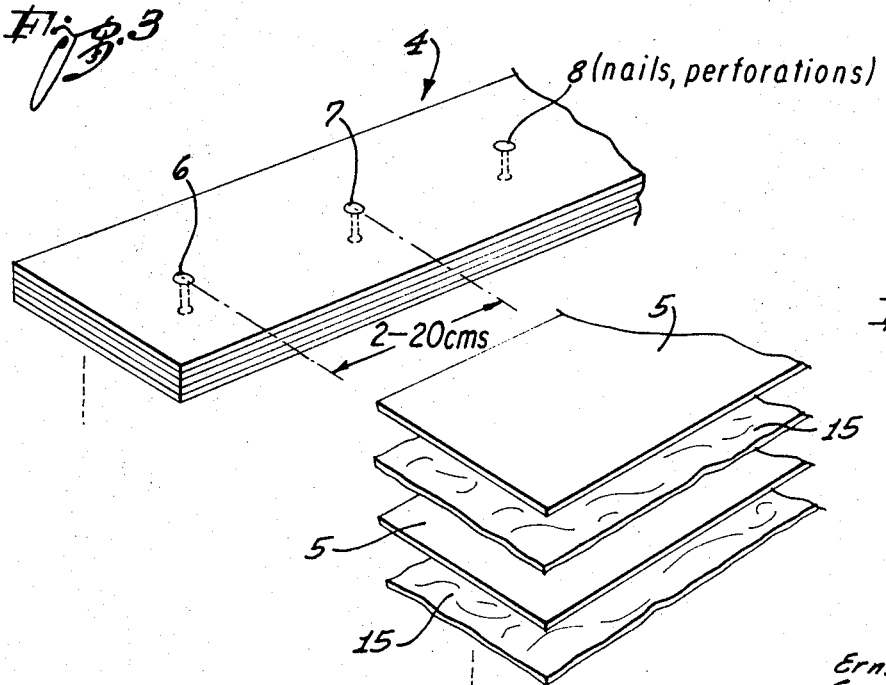
INVENTORS:-
Ernst Scheffler
Gerhard Ziemek
Smyth, Roston & Pavitt
ATTORNEYS

SPACER FOR COAXIAL PIPES

In accordance with recent developments extremely cooled cables, in the following called cryogenic cables, are used for the efficient transmission of electric energy. The cables themselves run in the interior of a pipe which is also filled with liquid helium. Protection against heat influx from the exterior is provided by a second or more pipes coaxially receiving the innermost pipe which is filled with liquid helium. The cylindrical ring space between the innermost pipe and the pipe of next larger diameter receiving the latter is evacuated and the vacuum is maintained throughout operation.

The ring space in between the second pipe and a third one receiving the second pipe is filled with liquid nitrogen. As long as the nitrogen remains at least in parts in the liquid phase, the temperature difference between the first and the second pipe will not exceed the difference in liquefaction temperatures of helium and nitrogen, so that even under variable external temperature conditions the heat influx into the inner pipe will not exceed a readily predetermined value. Finally, a fourth pipe circumscribes the third one and the space in-between them is again evacuated. The fourth pipe may be permitted to assume the ambient temperature, for example, room temperature.

In a different field of art it is known to employ coaxial pipe systems for transportation of fluids. There are two coaxial pipes, the inner ones constituting the conduit proper for the fluid, liquid or gas, and again the ring space between the pipes is thermally insulated. The thermal insulation is, for example, established by evacuation of the ring space, or this ring space is filled with thermally insulating material such as a foam or plastic rubber or the like.

In order to obtain maximum thermal insulations as between two such pipes, they should be positioned in coaxial relationship so that the (radial) distance of heat transfer is uniform. It has been suggested to dispose a helically wound bar as spacer in the ring space between two such pipes for mutually centering and supporting them in coaxial relationship. However, if such a bar is to fulfill its function as a spacer, it has to engage both pipes. The regions of engagement provide a heat bridge or path for directly conducting thermal energy between inner and outer pipes. It has been suggested to make these helical spacers from polytetrafluoroethylene, as such a material conducts heat very poorly. Nevertheless, it was found that heat losses are still too high for economic employment of such coaxial pipes, particularly when the temperature difference between fluid and environment is rather high.

In the foregoing the problem posed by heat conduction through the spacer element has been considered, however, heat radiation between the pipe must not be ignored. There is a considerable imbalance in the exchange of heat radiation between outer and inner pipes across the evacuated ring space, and this, of course, is true regardless of the direction of the temperature gradient. In fact, the resulting losses or heat influx are considerable and impose additional difficulties for the construction and employment of such coaxial pipe system.

Turning for the moment to the four-pipe example mentioned above for a cryogenic system, it was stated that the space between the second and the third pipe is filled with liquid nitrogen while the space between the third and the fourth (outer) pipe is evacuated; the fourth pipe being maintained at or assuming room temperature.

Insertion of additional pipes for further distribution and partitioning of the temperature gradient in order to increase the number of surfaces engaged in heat exchange results in some but still quite insufficient improvement. Moreover, it must not be forgotten that by increasing the number of coaxially positioned pipes the flexibility of the pipe system as a whole is reduced. Such flexibility, however, is necessary for installation. Corrugation of the pipes provides improvement here, but if the pipe system consists of too many coaxial pipes even corrugation does not impart sufficient flexibility upon the system as a whole.

It is an object of the present invention to improve the thermal conditions in a coaxial pipe system, if there is a temperature gradient between the pipes to be coaxial positioned, one onside another, such as in case of a cryogenic cable or of a pipe system for conduction of fluids which are hotter or colder than the environment.

It is another object of the present invention to provide a positioning spacer between two coaxial pipes or tubes having sufficient structural stability to serve as a spacer without materially deteriorating thermal isolation as is established, for example, by low-pressure vacuum between the pipes. It is a further object of the invention to provide an economic spacer arrangement between the two coaxial pipes which can be easily manufactured.

In accordance with the invention it is suggested to provide a rather loose pile of thermally insulating tapes as spacer element. The tapes of the pile and the pile as a whole wind around the inner pipe to establish a helix thereon. The tapes can be individually wound upon the outer surface of the inner pipe, one on top of the other, to gradually build up the thickness of the helical spacer until the desired thickness has been reached. Alternatively, and in the preferred form the tapes can be piled first and subsequently the pile is wound upon the inner pipe as a whole. In either case the dimensions are chosen so that the helix occupies space all across the ring gap between inner and outer pipe and does in fact serve as a supporting spacer engaging inner and outer pipes in radial direction accordingly.

Each of the tapes has a thickness which is a minute fraction of the desired thickness of the helix. Moreover, the sum total of the thickness of all the tapes used in the pile is still less than the thickness of the resulting helix because the tapes are to be piled loosely. Tapes in the pile which are juxtaposed actually exhibit an average distance from each other, and they engage in isolated points and lines only. Nowhere is there provided true surface-to-surface contact between neighboring tapes and covering relative large surface areas. This is not only due to the fact that there is no such thing as an ideally smooth surface, but aside from microscopic unevenesses, loosely piled tapes are not completely straight but are flexed to some degree.

As a consequence of piling tapes loosely, there are numerous heat bridges, but each is extremely small and they are constituted by statistically distributed points and lines where two respectively juxtaposed tapes engage. The total effective area of contact between two juxtaposed tapes through which heat can be transferred by conduction is still extremely small in relation to the overall surface area of the two tapes.

Another important point is the following; consider three tapes, an upper one, a middle one and a lower one. The upper tape will engage the middle one in points and lines which are not aligned (only in very rare exceptions) with those points and lines where the middle one engages the lower tape. Thus, heat conduction between upper and lower tapes and running through the middle tape does not have a travel path equal to the average distance between upper and lower tapes. Instead, the travel path is extended by the average distance between the points of contact of upper and middle tapes on one hand, and points of contact between middle and lower tapes on the other hand. This consideration, of course, can be repeated for each tape so that the total travel path for heat transversely through the pile of tapes is considerably larger than the thickness of the helix, whereby the thickness of the helix is generally equal to the gap width as defined by difference in outer and inner radii, respectively, of inner and outer pipes.

Moreover, even the points of contact of neighboring tapes form in effect a gap as to heat transfer and there is a temperature drop thereacross so that the heat resistance or impedance of heat conduction of the helical spacer is additionally increased. The individual tapes could have smooth surfaces as they still will not engage in broad surface-to-surface contact. Nevertheless, the tapes could be provided with uneven surface contour, i.e., surface could be rippled, corrugated, grooved, serrated, ribbed, or otherwise deformed, to minimize further "the probability of contact" and to thereby enlarge the effective travel path for heat transfer through the pile of tapes. Alternatively, smooth tapes in the pile could alternate which tapes having such deformed surface.

In order to prevent the tapes from slipping off the pile, particularly because of the generally loose piling contemplated here, the tapes are fastened together in isolated points along the extension. These connecting points are preferably several centimeters apart. As such connection points establish heat bridges, they should not be too frequent. For example, they should not be closer than about 2 centimeters. On the other hand, if there are too few fastening points, tape slippage may not be avoided to a sufficient degree, so that the distance between two points of fastening along two tapes should not exceed about 20 centimeters. It may be of advantage to stagger the points of contact. Considering the example above, the upper tape may be bonded to the middle tape in points which are not aligned with the points at which the middle tape is bonded to the lower tape.

In the most simple manner the tapes may be glued together to establish anchoring of the juxtaposed state. Alternatively, they could be welded. In order to simplify the fastening it may be of advantage to dispense with bonding altogether; instead pins or nails made of plastic are driven through all of the piled tapes on isolated spots. The areas of contact between the several tapes including the areas nailed are kept as small as possible to reduce further the total surface area of the tape through which heat can travel. The nails of pins can be very thin, and thus their contribution as thermal bridges for heat propagation is very small, particularly when considering the helix as a whole.

In accordance with another improvement, the tapes may be perforated and the metal foils can be inserted in the pile particularly to reduce the overall effect of temperature radiation between the two pipes to be positioned by this spacer.

While the specification concluded with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates a view into a coaxial pipe arrangement with the spacer in accordance with the present invention;

FIG. 2 illustrates a side view of the pipe of tapes used as a spacer for the pipes in FIG. 1;

FIG. 3 shows an enlarged portion of the spacer constructed of a pile of tapes; and FIG. 4 shows an exploded view of a portion of a pile.

The pipe system as illustrated in FIG. 1 includes three coaxially arranged pipes or tubes. There is an inner tube 1, an intermediate tube 2 and an outer tube 3. It is assumed that the inner tube receives an electrical cable to be operated in the superconductive state. In addition, tube 1 is filled with liquid helium having a temperature of 4° K. to maintain the cable in tube 1 in the superconductive state.

The ring space between tubes 2 and 3 is filled with liquid nitrogen having a temperature of approximately 77° K. Thus, tubes 1 and 2 have a temperature difference of somewhat above 70° C. This space between tubes 1 and 2 is evacuated so that there is practically no heat flow by convection or by any other molecular heat transfer such as conduction through gas etc. For example, the pressure in the ring space has been reduced to a value so that the means free path becomes comparable with the radial gap width of the space between the pipes 1 and 2.

Fortunately, the temperature of either pipe is exceedingly low so that the radiation maximum which can emanate from either pipe in accordance with Stefan Boltzman's law is very small. Thus, the radiation imbalance as between the two pipes even though rather large is still small in absolute terms. Moreover, both the outside of tube 1 and the inner surface of tube 2 can be made strongly reflective so that there is little absorption and little emission of radiation accordingly.

It follows, therefore, that the bulk of the heat transfer between tube 1 and 2 will result from heat conduction through the spacer. Therefore, it is necessary to establish a spacer with as little solid material as possible because heat conduction through a solid, even if regarded as a poor conductor, is still higher than conduction through gas, for example, at a pressure wherein the mean free path becomes comparable with the spacing between the pipes. These being the operating conditions posing the construction requirement for the thermal characteristics of the spacer that it must not materially deteriorate the thermal insulating property of the vacuum. Nevertheless, a requirement of overall stability of the construction must be considered as, of course, the spacer must fulfill its function for supporting one tube on the other and maintaining their coaxial relationship. Finally, the economic factor for making such a spacer arrangement should not be ignored entirely.

The invention meets the several requirements in every respect. As was mentioned above, a spacer 4 is constructed from a plurality of loosely piled, thermally insulating tapes 5; in other words, a plurality of tapes are piled one on top of the other to assemble spacer 4. The tapes are preferably made of polyamide.

As can be seen best from FIG. 2, the spacer 4 is thus produced by loosely piling of tapes, there being only isolated points or lines of contact between neighboring tapes. The points and lines of contact between the differing tapes are statistically distributed, and the distribution is different for each pair of the juxtaposed tape. In other words, the correlation function of the distributed points and lines of contact of two different pairs of respectively juxtaposed tapes is essentially zero. Thus, there are no heat bridges or thermal transfer paths running straight through the piles transverse to the plane of average tape extension. Instead, the available heat transfer path may meander through the pile at a total length considerably in excess of the thickness of the pile as a whole.

The tapes are, for example, bonded or welded together in isolated points sufficient to maintain the pile as a pile so that the tapes cannot slide off. The points of fastening are more than about 2 centimeters but less than about 20 centimeters apart. The spacers as formed are now helically wound or otherwise arranged in this space between the two pipes 1 and 2, which pipes become coaxially positioned therewith. The tapes can be twisted together to further reduce the area of contact with the pipe.

In a preferred form, particularly from the standpoint of economics, the pile of tapes should be formed first and wound on top of the inner pipe 1 as a whole and preferably, as stated, with a twist. In the alternative, the individual tapes may be wound helically on top of the inner pipe 1, one on top of the next one along the same helical path to build up the helix until the desired thickness has been obtained.

As indicated in dotted lines in FIG. 3, the tapes can be joined by running plastic nails, such as 6, 7 and 8, through all of them in isolated points. Of course, the nails themselves should have extremely poor heat conduction. If the assembled tapes are twisted, there will practically nowhere be a nail which actually connects the inner and outer pipes in a direct heat path.

Even if the tapes are smooth, the points and lines of contact between neighboring tapes are isolated and randomly distributed on a statistical basis so that there are hardly any heat bridges between neighboring tapes. This will be even more so the case if the tapes do not have smooth surfaces, or if juxtaposed tapes do not have smooth surfaces, at least one of them having ripples, serrations, corrugations, grooves or the like to further diminish the total number of contact points between neighboring tapes and particularly in order to avoid lines of contact, so that the total number of heat bridges, which is small to begin with in accordance with the principle of the invention, is reduced further. FIG. 4 illustrates alternating the piling of smooth tapes 5 with tapes 15 having an uneven surface.

It follows, therefore, that a helical spacer constructed in that manner has a very high heat resistance and the resulting conductivity is considerably lower than the heat conductivity of the material employed in the tapes. If a few metal foils are interposed the heat transfer radiation is reduced further. The pipes 2 and 3 can be spaced apart by a similar arrangement or in accordance with the conventional spacing arrangement providing and permitting free flow of liquid nitrogen through the ring space with a strong axial components between the two pipes in order to maintain a uniform temperature throughout.

The invention is not limited to the embodiments described above but all changes and modifications thereof not constituting departures from the spirit and scope of the invention are intended to be included.

We claim:

1. In a coaxial pipe system having at least two pipes to be coaxially arranged one around the other and having different temperature, an elongated spacer means helically wound onto the inner one of the two pipes for being interposed between the two pipes and coaxially positioning the outer one of the two pipes relative to the inner one for thermal insulation, the spacer means being comprised of loosely piled tapes of a material having low thermal conductivity, juxtaposed ones of the tapes being interconnected at spaced apart isolated points.

2. In a pipe system as in claim 1, the tapes having essentially smooth surfaces.

3. In a pipe system as in claim 1, the tapes having deformed uneven surfaces.

4. In a pipe system as in claim 1, smooth tapes alternate with tapes having deformed surfaces.

5. In a pipe system as in claim 1, the pile of tapes being twisted as wound onto the inner one of the pipes.

6. In a pipe system as in claim 5, the tapes being bonded or welded to each other at the spaced apart points.

7. In a pipe system as in claim 5, there being thermally insulating nails traversing the tapes for joining them.

8. In a pipe system as in claim 1, the loosely piled tapes being joined at spots spaced apart by a distance within the range from 2 to 20 centimeters.

9. In a pipe system as in claim 1, the pile of tapes including metal foils.

10. In a pipe system as in claim 1, the tapes being perforated.